US010913308B2

(12) United States Patent
Tsuzuki et al.

(10) Patent No.: US 10,913,308 B2
(45) Date of Patent: Feb. 9, 2021

(54) WHEEL DISC MANUFACTURING METHOD AND WHEEL DISC (71) Applicant: CENTRAL MOTOR WHEEL CO., LTD., Anjo (JP)

(72) Inventors: Kazuna Tsuzuki, Nishio (JP); Shinji Yamada, Miyoshi (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 120 days.

(21) Appl. No.: 15/776,167

(22) PCT Filed: Nov. 17, 2015

(86) PCT No.: PCT/JP2015/082277
§ 371 (c)(1),
(2) Date: May 15, 2018

(87) PCT Pub. No.: WO2017/085790
PCT Pub. Date: May 26, 2017

(65) Prior Publication Data
US 2019/0143746 A1 May 16, 2019

(51) Int. Cl.
B60B 3/00 (2006.01)
B60B 3/04 (2006.01)
(Continued)

(52) U.S. Cl.
CPC ............ B60B 3/044 (2013.01); B21D 53/265 (2013.01); B60B 3/02 (2013.01); B60B 3/04 (2013.01);
(Continued)

(58) Field of Classification Search
CPC .. B60B 3/044; B60B 3/04; B60B 3/02; B60B 2310/213; B60B 2310/211;
(Continued)

(56) References Cited

U.S. PATENT DOCUMENTS

2002/0007556 A1    1/2002  Marron et al.
2002/0067066 A1*   6/2002  Kashiwai ............... B21D 53/26
                                                          301/63.101
2015/0001913 A1*   1/2015  Abe ......................... B60B 3/04
                                                          301/63.101

FOREIGN PATENT DOCUMENTS

JP    H11-227401 A    8/1999
JP    2002-045939 A   2/2002
(Continued)

Primary Examiner — Lawrence Averick
(74) Attorney, Agent, or Firm — Oliff PLC (57) ABSTRACT A manufacturing method for a wheel disc, includes forming a flange portion, wherein the flange portion is formed such that an inner mold and an outer mold having a cylindrical inner surface with a first inside radius larger than the first outside radius and placed above the inner mold coaxially to the inner mold are brought close relative to each other in an axial direction by one stroke so that the outer edge of the disc material is bent downward, and the cylindrical inner surface of the outer mold is provided with recessed portions hollowed outwardly in a wheel radial direction, the recessed portions being formed in ranges corresponding to the window portions in the wheel circumferential direction and in a range from a middle position to a bottom end in the wheel axial direction.

5 Claims, 11 Drawing Sheets (51) Int. Cl.
*B60B 3/02* (2006.01)
*B60B 21/02* (2006.01)
*B21D 53/26* (2006.01)

(52) U.S. Cl.
CPC ............... *B60B 3/002* (2013.01); *B60B 21/02* (2013.01); *B60B 2310/206* (2013.01); *B60B 2310/208* (2013.01); *B60B 2310/211* (2013.01); *B60B 2310/213* (2013.01); *B60B 2900/111* (2013.01)

(58) Field of Classification Search
CPC ........ B60B 2310/206; B60B 2310/208; B60B 3/002; B60B 21/02; B60B 2900/111; B21D 53/265
See application file for complete search history.

(56) References Cited

FOREIGN PATENT DOCUMENTS

| | | |
|---|---|---|
| JP | 2005-074500 A | 3/2005 |
| JP | 2008-238990 A | 10/2008 |
| JP | 2010-025350 A | 2/2010 |

\* cited by examiner

WHEEL RADIAL DIRECTION

INWARD ⟷ OUTWARD

WINDOW PORTION — WHEEL RADIAL DIRECTION (INWARD ↔ OUTWARD)

BASE PORTION — WHEEL RADIAL DIRECTION (INWARD ↔ OUTWARD)

(a1)

(a2)

(b1)

(b2)

(c1)

(c2)

WINDOW PORTION

BASE PORTION

WHEEL RADIAL DIRECTION  
INWARD ⟷ OUTWARD

WHEEL RADIAL DIRECTION  
INWARD ⟷ OUTWARD (a1)

(a2)

(b1)

(b2)

(c1)

(c2)

WINDOW PORTION

BASE PORTION

FIG. 11

WHEEL DISC MANUFACTURING METHOD AND WHEEL DISC

TECHNICAL FIELD

The invention relates to a manufacturing method for a wheel disc to be joined to a wheel rim to form a wheel, and the wheel disc.

BACKGROUND ART

Conventionally, there has been widely known a so-called two-piece type wheel as an automobile wheel. The two-piece type wheel is obtained such that a flange portion formed on the outer periphery of a wheel disc so as to extend inwardly in the vehicle width direction is fitted and welded to the inner peripheral surface of a predetermined joining part of a wheel rim (see Japanese Unexamined Patent Application Publication No. 2008-238990, for example).

In the wheel disc described in the publication, the flange portion includes "a plurality of base portions provided in a plurality of ranges different from each other in the wheel circumferential direction and having a uniform basic length in the wheel axial direction," and "a plurality of window portions each provided between the base portions adjacent to each other in the wheel circumferential direction and having a length, in the wheel axial direction, shorter than the basic length." The reason why the window portions are provided in the flange portion as such is to reduce the weight of the wheel disc and to use a disc material for the wheel disc without waste.

Figure 3:
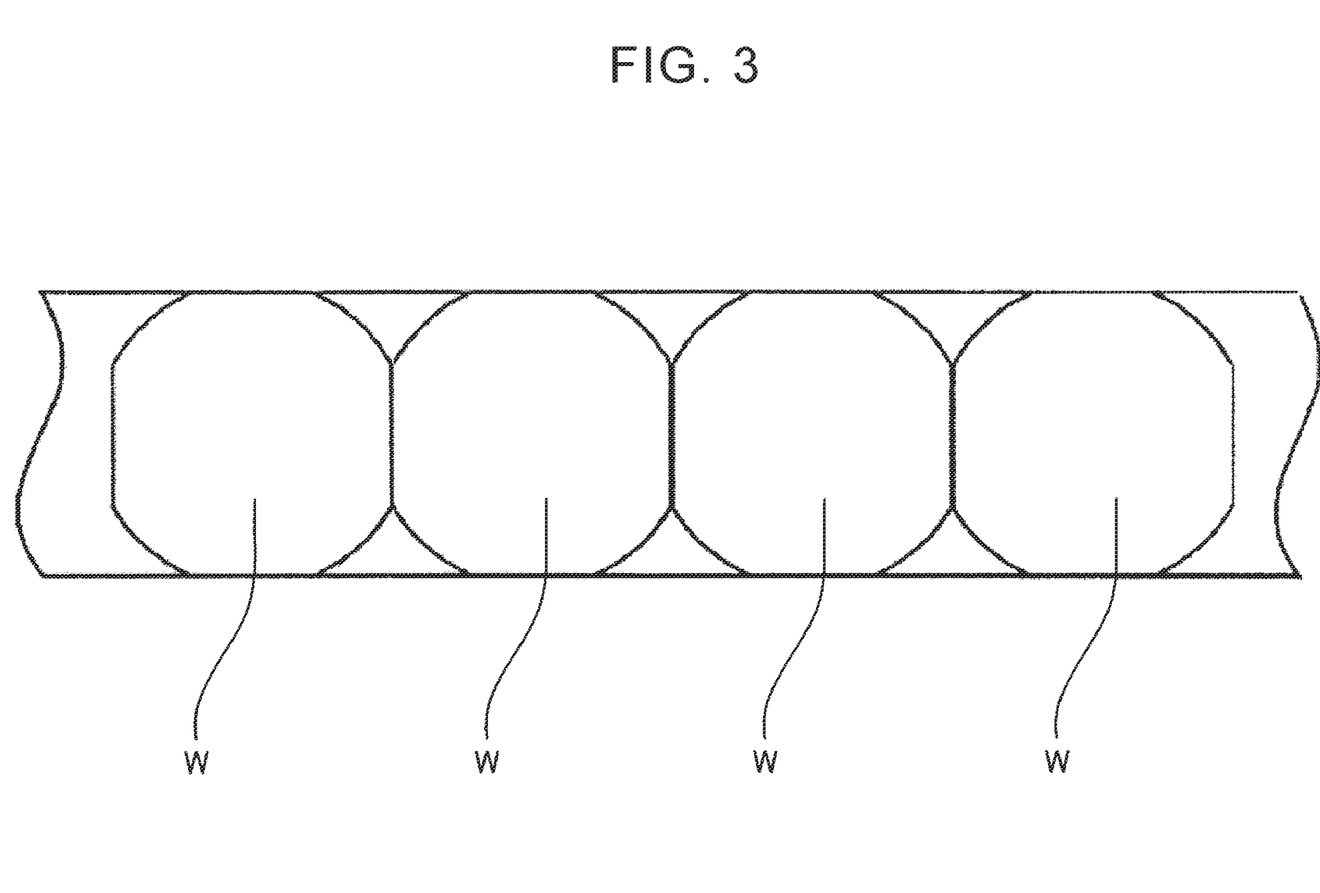
FIG. 3 is a view to describe an example of a manufacturing method for a disc material.

The wheel disc provided with the flange portion having the window portions is formed generally by performing press working, drawing, and so on several times on a flat disc material having a generally square shape with four arcuate corners as illustrated in FIG. 3. Particularly, the flange portion is formed by drawing. In this case, arcuate parts at four corners in the outer edge of the disc material become base portions in the flange portion, and linear parts other than the four corners in the outer edge of the disc material become window portions in the flange portion.

Generally, the wheel disc is joined to the wheel rim such that inner end surfaces, in the vehicle width direction, of the base portions of the flange portion are welded by fillet welding to the inner peripheral surface of the wheel rim. The window portions of the flange portion are not welded to the wheel rim, but the window portions make contact with the inner peripheral surface of the wheel rim. This contributes to improvement in rigidity as the whole wheel.

In order to raise the improvement degree of the rigidity of the whole wheel by the window portions of the flange portion, contact areas of the window portions of the flange portion with the inner peripheral surface of the wheel rim should be increased. For this purpose, the length of the window portions in the wheel axial direction (particularly, their minimum length) should be increased.

On this account, it is required to maximize the ratio of the minimum length, in the wheel axial direction, of the window portions of the flange portion to the basic length of the base portions of the flange portion, with the use of disc materials having the same size and the same shape. The invention is accomplished in order to meet the requirement, and an object of the invention is to provide a manufacturing method for a wheel disc in which the ratio of the minimum length, in the wheel axial direction, of a window portion of a flange portion to the basic length of a base portion of the flange portion is easily increased, and to provide the wheel disc.

SUMMARY OF THE INVENTION

A wheel disc according to the invention includes an annular flange portion provided in the outer periphery so as to extend inwardly in the vehicle width direction generally in parallel with the wheel axial direction. The flange portion includes a plurality of base portions provided in a plurality of ranges different from each other in the wheel circumferential direction and having a uniform basic length in the wheel axial direction, and a plurality of window portions each provided between the base portions adjacent to each other in the wheel circumferential direction and having a length, in the wheel axial direction, shorter than the basic length.

A manufacturing method for the wheel disc includes forming the flange portion such that the outer edge of a disc material in which the flange portion has not been formed is bent inwardly in the vehicle width direction over a whole circumferential region so as to be generally in parallel with the wheel axial direction. In the forming the flange portions, the flange portion is formed such that, in a state where the disc material is coaxially put on an inner mold having a cylindrical outer surface with a first outside radius, the inner mold and an outer mold having a cylindrical inner surface with a first inside radius larger than the first outside radius and placed above the inner mold coaxially to the inner mold are brought close relative to each other in the axial direction by one stroke, so that the outer edge of the disc material is bent downward.

The manufacturing method, according to the invention, is characterized in that the cylindrical inner surface of the outer mold is provided with recessed portions hollowed outwardly in the wheel radial direction, the recessed portions being formed in ranges corresponding to the window portions in the wheel circumferential direction and in a range from a middle position to the bottom end in the wheel axial direction. Here, an inner surface of each of the recessed portions may constitute a part of a cylindrical inner surface having a second inside radius larger than the first inside radius. The lengths, in the wheel axial direction, of the recessed portions may be equal to or more than the basic length.

Hereinbelow, for purposes of this description, machining in which the outer edge of the disc material, extending outwardly in the wheel radial direction, is bent downward over the whole region in the wheel circumferential direction by bringing the inner mold and the outer mold close relative to each other in the wheel axial direction in the state where the disc material is put on the inner mold is referred to as "drawing." The outer mold has the cylindrical inner surface with the inside radius larger than the outside radius of the cylindrical outer surface of the inner mold and is placed above the inner mold coaxially to the inner mold. Further, a case where a gap between the outside radius of the inner mold and the inside radius of the outer mold is less than the thickness of the outer edge of the disc material at this point (that is, machining with plastic deformation that forcibly decreases the thickness of the outer edge of the disc material) is referred to as "ironing."

In the above configuration, more specifically, a gap (a first gap), in the wheel radial direction, between the first outside radius of the inner mold and the first inside radius of the outer mold may be less than the thickness of the outer edge of the disc material (just before the forming the flange portion), and a gap (a second gap), in the wheel radial direction, between the first outside radius of the inner mold and the second inside radius of the outer mold may be also less than the thickness of the outer edge of the disc material (just before the start of the forming the flange portion). This case will be referred to as a "first case."

In the "first case," "drawing" and "ironing" are performed at the same time throughout one stroke in the base portion of the flange portion. In the window portion of the flange portion, "drawing" and "ironing" are performed at the same time in the first half (a stage at which the cylindrical inner surface having the second inside radius contributes to machining) of one stroke, and only "ironing" is performed in the state where the outer edge of the disc material has adhered to the cylindrical outer surface of the inner mold in the second half (a stage at which the cylindrical inner surface having the first inside radius contributes to machining) of one stroke.

Further, the "first gap" may be equal to or more than the thickness of the outer edge of the disc material (just before the start of the forming the flange portion) and the "second gap" may be also equal to or more than the thickness of the outer edge of the disc material (just before the start of the forming the flange portion). This case will be referred to as a "second case."

Figure 11:
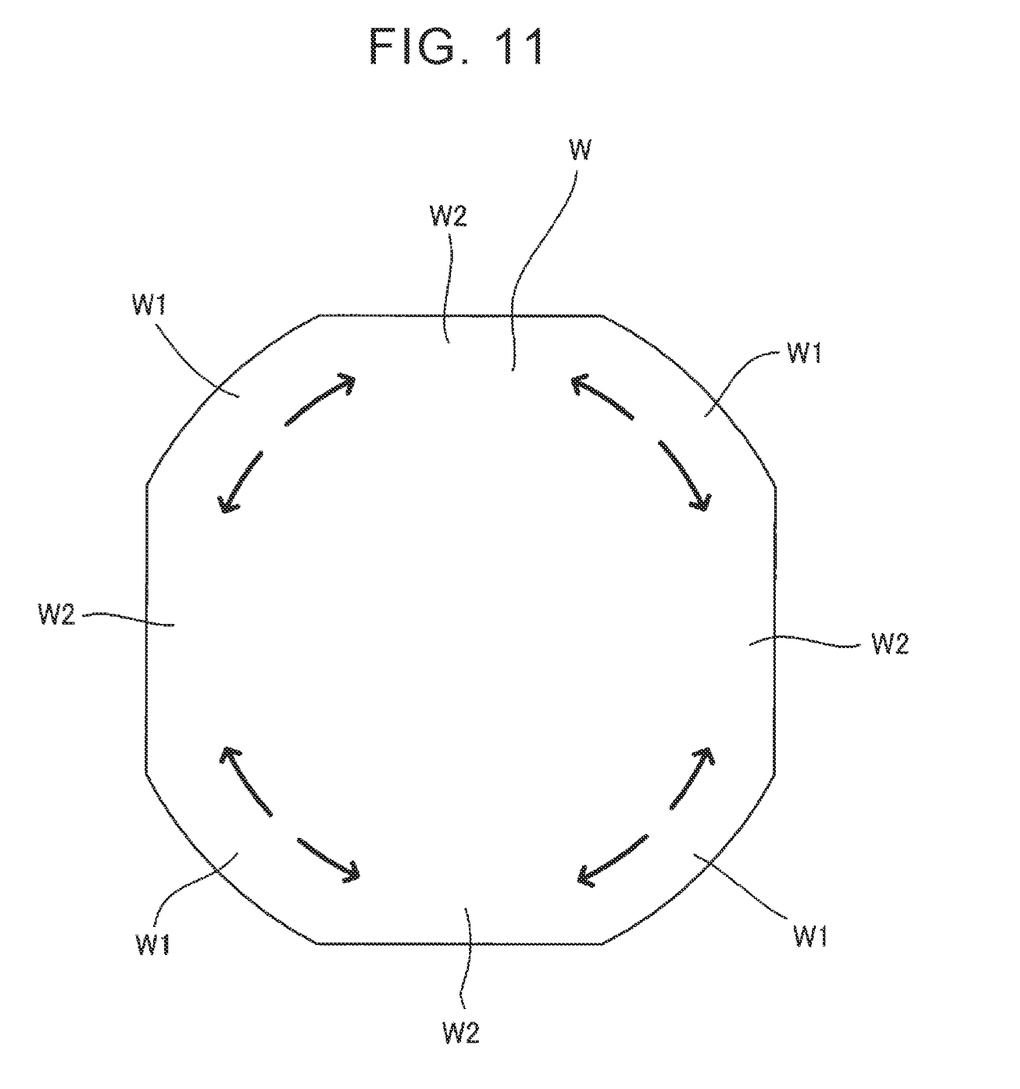
FIG. 11 is a view to describe the direction of a material flow generated in the disc material in the flange portion forming step.

In the "second case," only "drawing" is performed throughout one stroke in the base portion of the flange portion, while only "drawing" is performed in the first half of one stroke in the window portion of the flange portion. Further, as illustrated in FIG. 11 described below, when "drawing" is performed on the whole circumferential region of the outer edge of the disc material, flows of the material from arcuate parts at four corners in the outer edge of the disc material to their adjacent linear parts in the outer edge occur inevitably. That is, at the point when the first half of one stroke is finished, the thickness of a part, of the disc material, corresponding to the window portion of the flange portion can be increased to be larger than the "first gap." As a result, in the window portion of the flange portion, only "ironing" is performed in the second half of one stroke in the state where the outer edge of the disc material has adhered to the cylindrical outer surface of the inner mold.

Further, the "first gap" may be less than the thickness of the outer edge of the disc material (just before the start of the forming the flange portion) and the "second gap" may be equal to or more than the thickness of the outer edge of the disc material (just before the start of the forming the flange portion). This case will be referred to as a "third case."

In the "third case," "drawing" and "ironing" are performed at the same time throughout one stroke in the base portion of the flange portion, and only "drawing" is performed in the first half of one stroke in the window portion of the flange portion. At the point when the first half of one stroke is finished, the thickness of a part, of the disc material, corresponding to the window portion of the flange portion can be larger than the "first gap" due to the same mechanism as the "second case." As a result, in the window portion of the flange portion, only "ironing" is performed in the second half of one stroke in the state where the outer edge of the disc material has adhered to the cylindrical outer surface of the inner mold.

Here, in the case where only "drawing" is performed (that is, in the case where the outer edge of the disc material is just bent without performing "ironing"), a "phenomenon that a downward flow amount of the material of a radially outside part of the outer edge of the bent disc material becomes larger than a downward flow amount of the material of a radially inside part of the outer edge due to a frictional force generated on the contact face between the outer edge of the disc material and the cylindrical inner surface of the outer mold at the time when the outer mold is moved downward relative to the inner mold" (hereinafter referred to as an "unbalanced flow phenomenon") does not occur (or hardly occurs).

As a result, particularly in the case where the end surface of the outer edge of the flat disc material just before the start of the forming the flange portion is parallel to the thickness direction of the disc material, there does not occur (or hardly occurs) such a situation that the axial length of the radially outside part of the outer edge of the bent disc material becomes longer than the axial length of the radially inside part thereof. In other words, there does not occur (or hardly occurs) such a situation that the end surface of the outer edge of the disc material bent along the wheel axial direction is inclined from the wheel radial direction such that the length, in the wheel axial direction, of the radially outside part becomes longer than the length, in the wheel axial direction, of the radially inside part. Hereinbelow, in terms of a direction where the end surface of the outer edge of the disc material bent along the wheel axial direction is inclined such that the length, in the wheel axial direction, of the radially outside part becomes longer than the length, in the wheel axial direction, of the radially inside part, a tilt angle of the end surface from the wheel radial direction is just referred to as a "tilt angle" (see $\theta 1$, $\theta 2$ in FIGS. 7 to 10 described below). Accordingly, in the case where only "drawing" is performed, the "unbalanced flow phenomenon" does not occur (or hardly occurs), so that the "tilt angle" is zero (or a very small value near zero).

In the case where "drawing" and "ironing" are performed at the same time (that is, in the case where "ironing" is performed while the outer edge of the disc material is being bent), "ironing" is performed in the state where the outer edge of the disc material has not adhered to the cylindrical outer surface of the inner mold. Accordingly, a downward flow of the material of the radially outside part in the outer edge of the bent disc material easily occurs due to the frictional force, while a downward flow of the material of the radially inside part in the outer edge of the disc material can relatively freely occur. As a result, the "unbalanced flow phenomenon" does not occur conspicuously. Accordingly, the "tilt angle" is relatively small.

In the meantime, in the case where only "ironing" is performed, "ironing" is started and performed in the state where the outer edge of the disc material has adhered to the cylindrical outer surface of the inner mold as described above. Accordingly, in this case, a downward flow of the material of the radially outside part in the outer edge of the bent disc material easily occurs due to the frictional force, while a downward flow of the material of the radially inside part in the outer edge of the disc material can hardly occur. As a result, the "unbalanced flow phenomenon" easily occurs conspicuously. Accordingly, the "tilt angle" is relatively large.

In any of the "first case" to the "third case," in the base portion of the flange portion, only "drawing" is performed or "drawing" and "ironing" are performed at the same time throughout one stroke. Accordingly, the "tilt angle" of the end surface of the base portion of the flange portion is eventually zero or relatively small. In the meantime, in the window portion of the flange portion, only "drawing" is performed or "drawing" and "ironing" are performed at the same time in the first half of one stroke, so that the "tilt angle" of the end surface of the window portion of the flange portion is zero or relatively small at the end of the first half of one stroke. After that, in the second half of one stroke, only "ironing" is performed. Eventually, the "tilt angle" of the end surface of the window portion of the flange portion is relatively large.

Here, in terms of the window portion of the flange portion, as the "tilt angle" is larger, the minimum length, in the wheel axial direction, of the window portion of the flange portion (accordingly, the contact area between the window portion and the wheel rim) tends to be larger (that is, the rigidity as the whole wheel tends to improve). Further, in terms of the base portion of the flange portion, as the "tilt angle" is smaller (that is, the angle between the end surface of the base portion and the inner peripheral surface of the wheel rim becomes closer to a right angle), the weld strength at the time when the end surface of the base portion of the flange portion is welded by fillet welding to the inner peripheral surface of the wheel rim tends to be larger.

In any of the "first case" to the "third case," the "tilt angle" (=the first tilt angle) easily becomes large in terms of the window portion of the flange portion, and the "tilt angle" (=the second title angle) easily becomes small in terms of the base portion of the flange portion. Consequently, the rigidity as the whole wheel can be improved, and the weld strength at the time when the end surface of the base portion of the flange portion is welded by fillet welding to the inner peripheral surface of the wheel rim can be made large.

Particularly in the "second case," "ironing" is not performed in the base portion of the flange portion. Accordingly, the "unbalanced flow phenomenon" does not occur (or hardly occurs), so that the "tilt angle" is zero (or a very small value near zero). Accordingly, the weld strength at the time when the end surface of the base portion of the flange portion is welded by fillet welding to the inner peripheral surface of the wheel rim can be made largest.

MODES FOR CARRYING OUT THE INVENTION

The following describes a wheel disc 100 and a manufacturing method for the wheel disc 100 according to an embodiment of the invention with reference to the drawings. Hereinbelow, "inwardly (outwardly) in the vehicle width direction" indicates the inner side (outer side) of a vehicle along the wheel axial direction in the state where an automotive wheel is attached to the vehicle.

Figure 1:
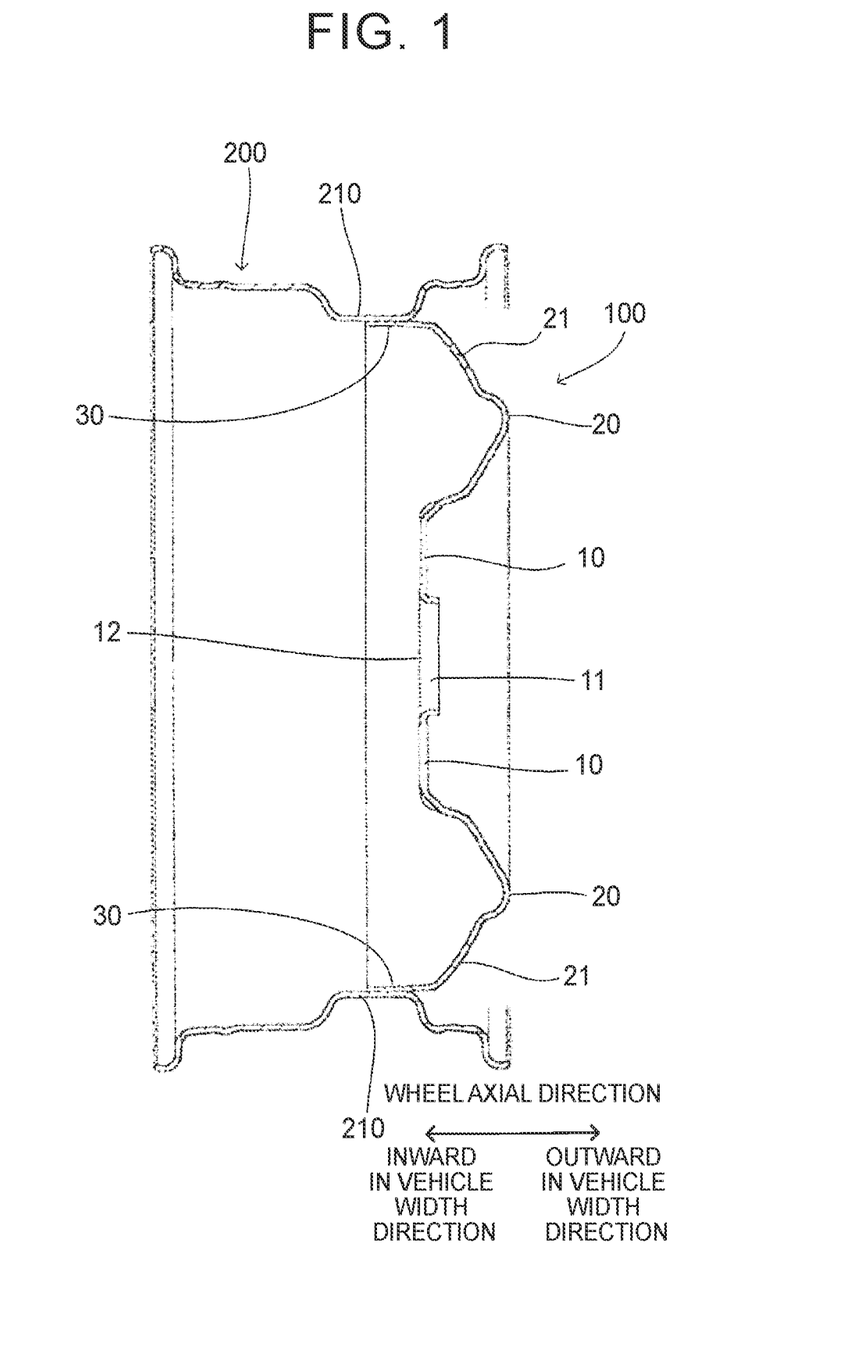
FIG. 1 is a drawing of a longitudinal section of an example of an automotive wheel obtained such that a flange portion of a wheel disc according to an embodiment of the invention is fitted and welded to a wheel rim.

FIG. 1 illustrates an example of an automotive wheel using the wheel disc 100. The automotive wheel is a so-called two-piece type wheel constituted by the wheel disc 100 and a wheel rim 200.

The wheel illustrated in FIG. 1 is obtained such that a flange portion 30 of the wheel disc 100 is inserted and fitted to the inner peripheral surface of a well portion (drop portion) 210 of the wheel rim 200, and an inner end surface, in the vehicle width direction, of the flange portion 30 is integrally joined to the well portion 210 by fillet welding. The fillet welding is performed by using a technique such as arc-welding and laser welding. Instead of the fillet welding, spot welding may be used.

The wheel disc 100 and the wheel rim 200 are typically made of a steel lumber. The wheel rim 200 can be typically formed integrally by performing roll forming, and the like on a cylindrical rim material. Details of the manufacturing method for the wheel disc 100 will be described later.

(Configuration of Wheel Disc 100)

Figure 2:
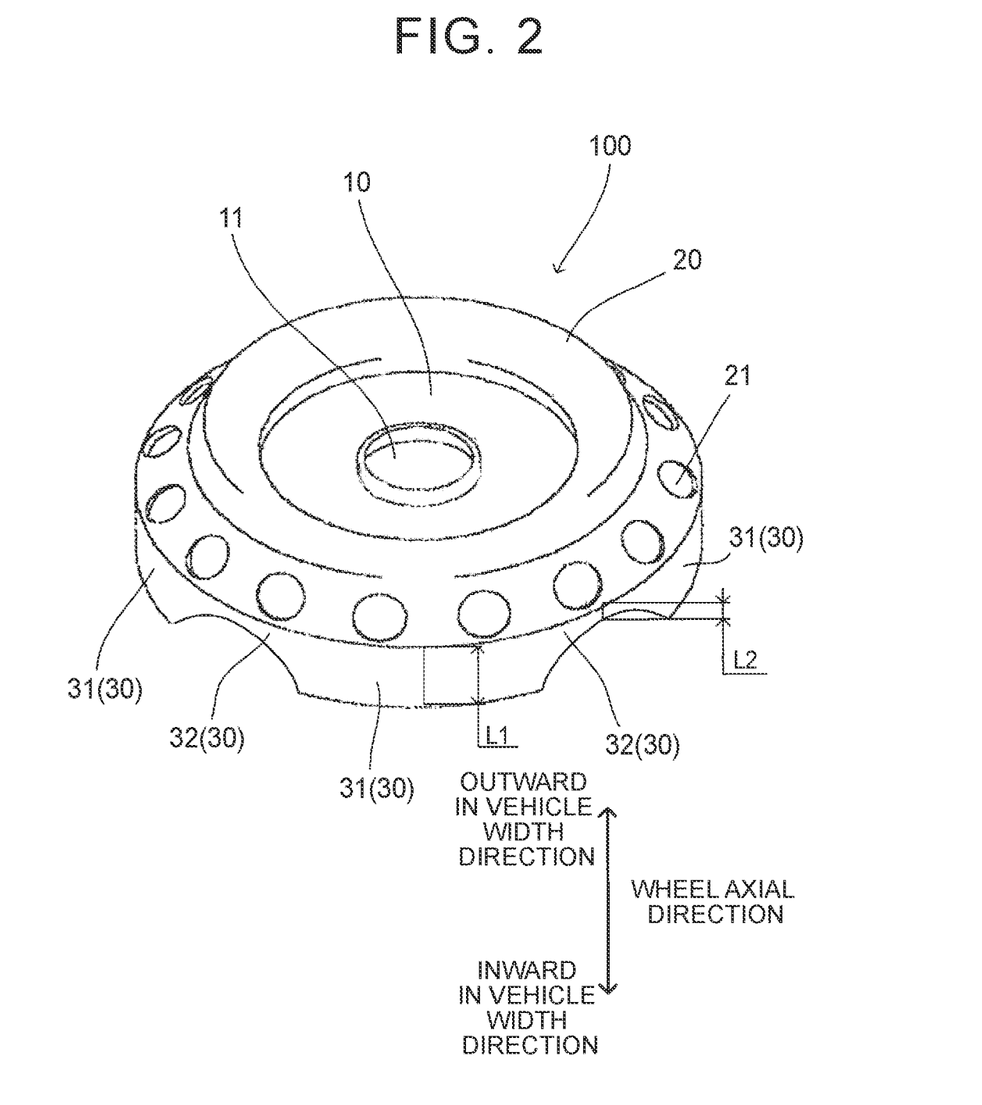
FIG. 2 is a perspective view of the wheel disc illustrated in FIG. 1.

As illustrated in FIGS. 1 and 2, the wheel disc 100 is constituted by a hub attachment portion 10, a ridge 20, and the flange portion 30.

The hub attachment portion 10 is a part having a generally disc shape expanding coaxially around a wheel shaft. The hub attachment portion 10 is provided with a hub hole 11 coaxial to the wheel shaft. The inner side of the hub attachment portion 10 in the vehicle width direction is provided with a hub attachment surface 12 to be attached, by pressure bonding, to a hub of the automobile.

The ridge 20 is an annular portion continuing outwardly in the wheel radial direction from the hub attachment portion 10 over the whole region in the wheel circumferential direction and rises outwardly in the vehicle width direction over the entire region in the wheel circumferential direction. A plurality of decoration holes 21 is formed on the outer inclined surface of the ridge 20 in the wheel radial direction such that the decoration holes 21 are provided at regular intervals in the wheel circumferential direction.

The flange portion 30 is an annular flange portion extending inwardly in the vehicle width direction over the whole region in the wheel circumferential direction from the outer edge on the outer side of the ridge 20 in the wheel radial direction, and constitutes the outer periphery of the wheel disc 100.

As illustrated in FIG. 2, the flange portion 30 is constituted by a plurality of (four in the example) base portions 31, and a plurality of (four in the example) window portions 32. The base portions 31 are positioned at regular intervals in the wheel circumferential direction, and each of the window portions 32 is positioned between the base portions 31 adjacent to each other.

The positions, in the wheel axial direction, of inner end surfaces of the base portions 31 in the vehicle width direction are the same. That is, the lengths, in the wheel axial direction, of the base portions 31 are uniformly set to a basic length L1 (see FIG. 2). Inner end surfaces of the window portions 32 in the vehicle width direction are arcuately recessed outwardly in the vehicle width direction. That is, the lengths, in the wheel axial direction, of the window portions 32 are shorter than the basic length L1. The minimum lengths, in the wheel axial direction, of the window portions 32 are assumed L2 (see FIG. 2).

(Manufacturing Method for Wheel Disc 100)

The wheel disc 100 is formed by performing press working, drawing, and so on several times on a flat disc material W illustrated in FIG. 3. The disc material W is a generally square-shaped flat plate having four arcuate corners. For example, as illustrated in FIG. 3, the disc material W can be obtained by performing punching on a long board-shaped steel flat plate.

In the case of the disc material W, arcuate parts (see W1 in FIG. 11 described later) at four corners in the outer edge of the disc material W become the base portions 31 of the flange portion 30 afterwards, and linear parts (see W2 in FIG. 11) other than the four corners in the outer edge of the disc material W become the window portions 32 in the flange portion 30 afterwards.

The wheel disc 100 is joined to the wheel rim 200 such that the inner end surfaces, in the vehicle width direction, of the base portions 31 of the flange portion 30 are subjected to fillet welding to the inner peripheral surface of the wheel rim 200 (more exactly, the well portion 210). The window portions 32 of the flange portion 30 are not welded to the wheel rim 200, but the window portions 32 make contact with the inner peripheral surface of the wheel rim 200 (more exactly, the well portion 210). This contributes to improvement in rigidity as the whole wheel.

Figure 4:
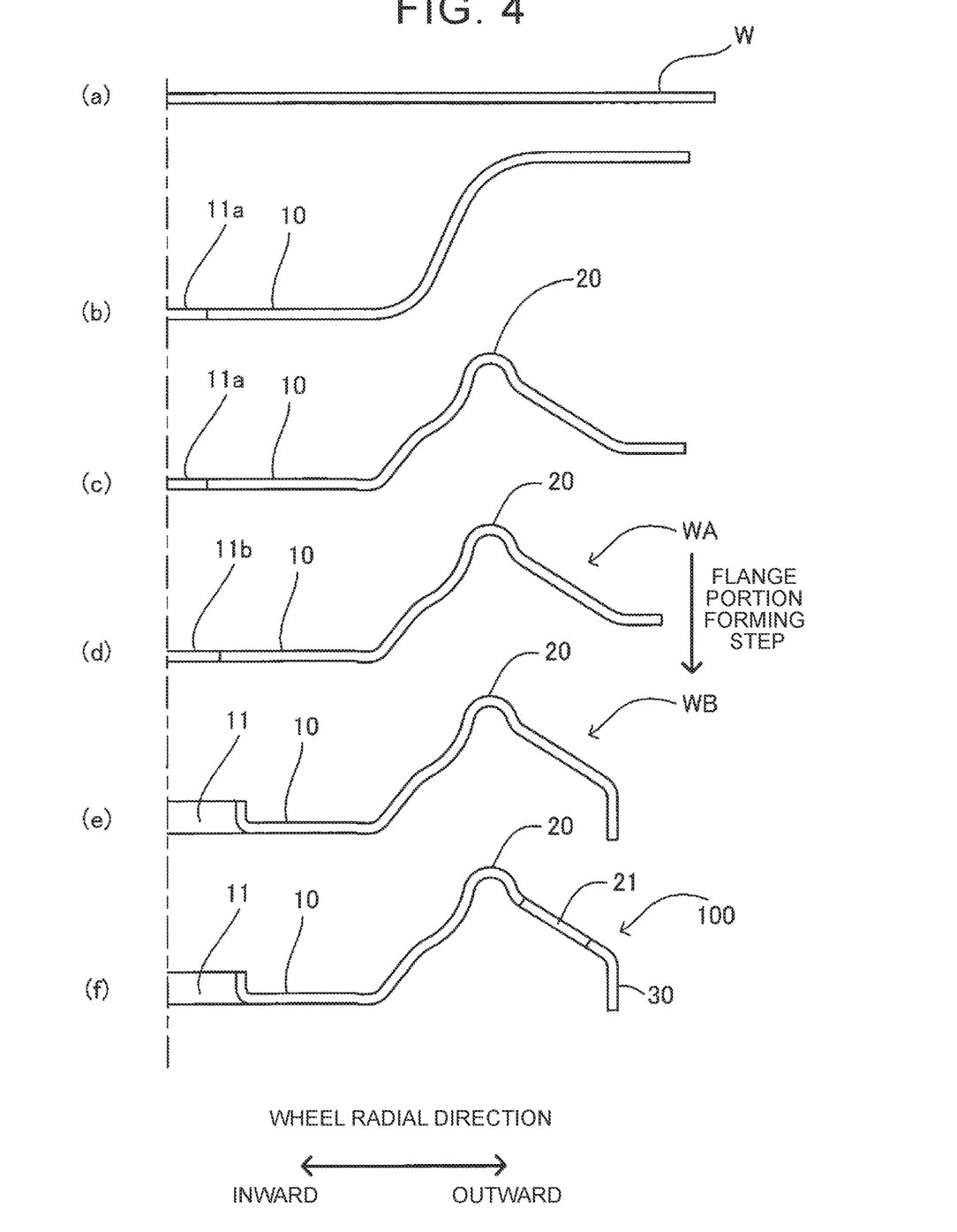
FIG. 4 is a view illustrating the course of a form change of the disc material at the time when the wheel disc illustrated in FIG. 1 is obtained by performing press working, drawing, and so on several times on the disc material.

FIG. 4 is a view illustrating an example of the course of a form change of the disc material W when the wheel disc 100 is obtained by performing press working, drawing, and so on several times on the disc material W. First, from FIG. 4(a) to FIG. 4(b), the hub attachment portion 10 and a generally square hub base hole 11a as a base for the hub hole 11 are formed by well-known press working and drawing.

From FIG. 4(b) to FIG. 4(c), the ridge 20 is formed by well-known drawing. From FIG. 4(c) to FIG. 4(d), a circular hub base hole 11b as a base for the hub hole 11 is formed by well-known press working.

From FIG. 4(d) to FIG. 4(e), the hub hole 11 is formed by annularly bending a part around the hub base hole 11b upward (outwardly in the vehicle width direction) by well-known drawing. Further, by a flange portion forming step, the outer edge of the disc material is annularly bent downward (inwardly in the vehicle width direction), so as to form the flange portion 30.

Hereinbelow, the disc material W just before the start of the flange portion forming step is referred to as a disc material WA, and the disc material W just after the end of the flange portion forming step is referred to as a disc material WB (see FIG. 4(d), FIG. 4(e)). The flange portion forming step will be described later more specifically.

From FIG. 4(e) to FIG. 4(f), the decoration holes 21 are formed by well-known press working. Hereby, the wheel disc 100 is finished.

(Flange Portion Forming Step)

Figure 5:
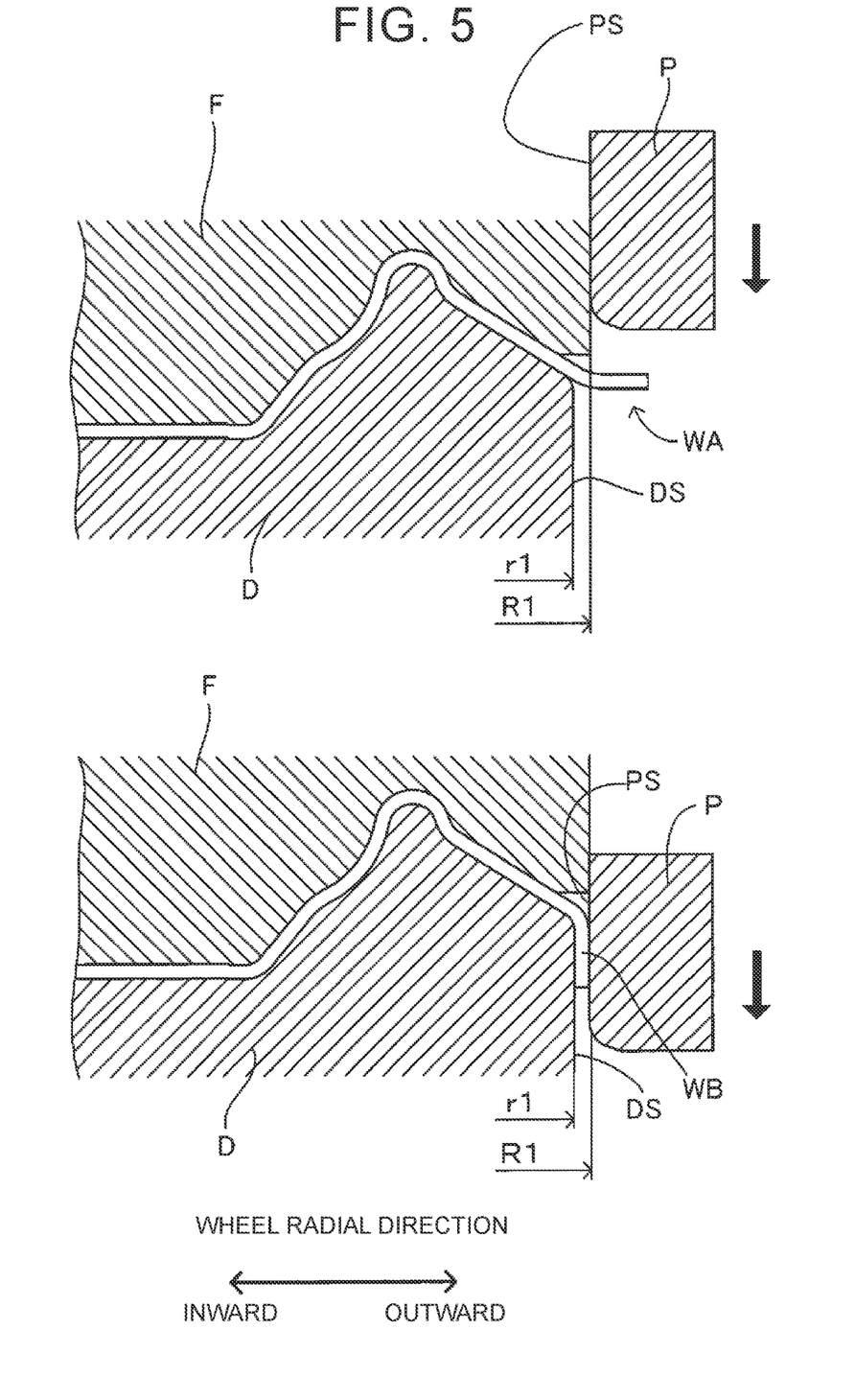
FIG. 5 is a view to describe a flange portion forming step ((d)→(e) in FIG. 4).

With reference to FIG. 5, the summary of the flange portion forming step will be described. In the flange portion forming step, first, the disc material WA is sandwiched between an inner mold D having a cylindrical outer surface DS with a first outside radius r1 and a float die F placed above the inner mold D so as to be coaxially movable in the up-down direction. In this state, the outer edge of the disc material WA protrudes outwardly in the wheel radial direction over the whole circumference in the wheel circumferential direction.

Subsequently, in this state, an outer mold P having a cylindrical inner surface PS with a first inside radius R1 larger than the first outside radius r1 is advanced by one stroke from the upper side to the lower side coaxially to the inner mold D along the outer peripheral surface of the float die F. Hereby, the outer edge of the disc material WA is bent downward (inwardly in the vehicle width direction) along the cylindrical inner surface PS over the whole region in the wheel circumferential direction, so that the flange portion 30 is formed (that is, the disc material WB is obtained).

Figure 6:
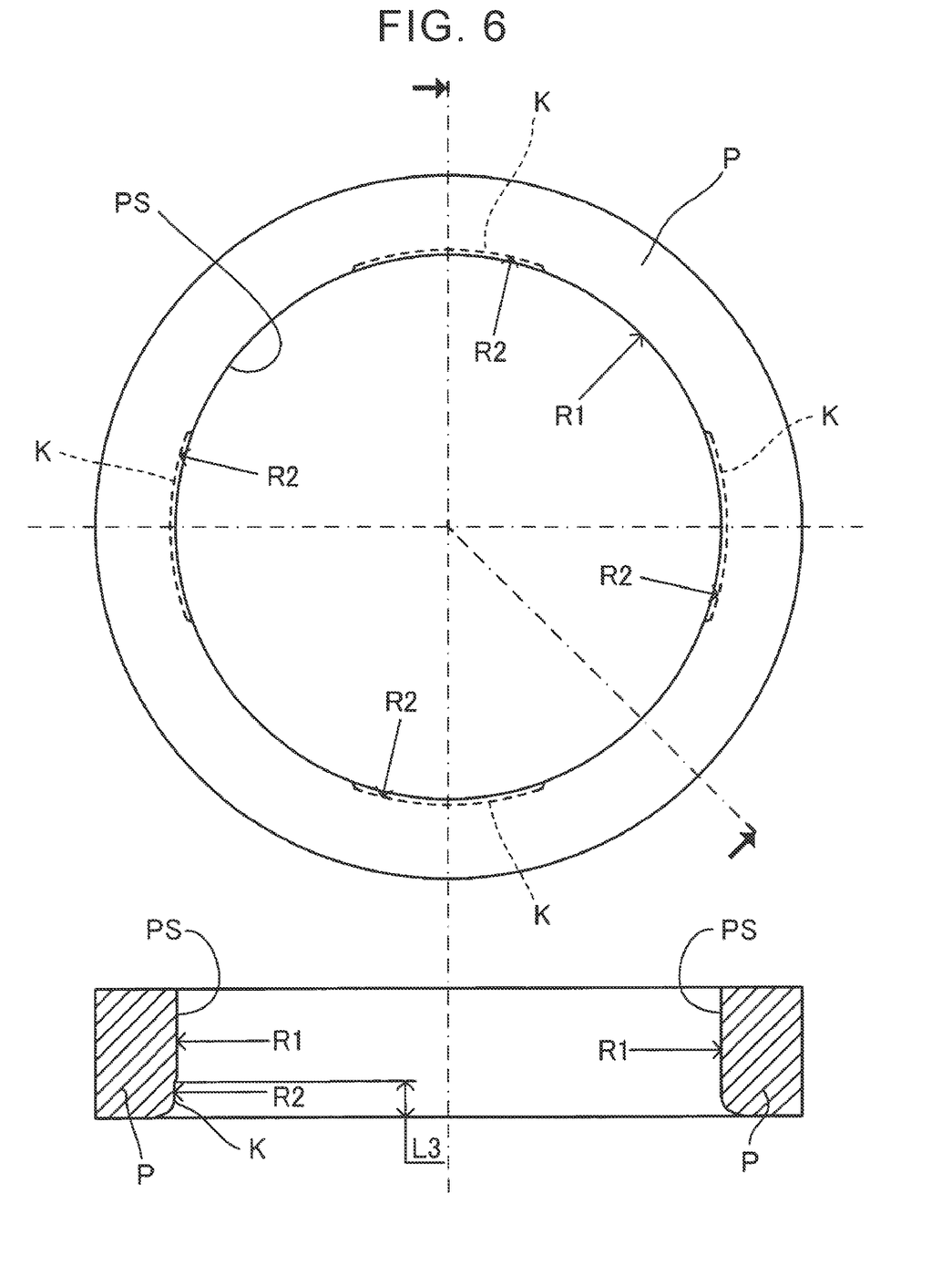
FIG. 6 is a view illustrating an example of an outer mold used in the flange portion forming step.

Here, the flange portion forming step has a feature in the shape of the cylindrical inner surface PS of the outer mold P. More specifically, as illustrated in FIG. 6, a recessed portion K hollowed outwardly in the wheel radial direction is formed on the cylindrical inner surface PS (having the first inside radius R1) of the outer mold P, in a range corresponding to the window portion 32 (the linear part W2 of the disc material W illustrated in FIG. 11) in the wheel circumferential direction and in a range from a middle position to the bottom end in the wheel axial direction.

The inner surface of the recessed portion K constitutes a part of a cylindrical inner surface having a second inside radius R2 larger than the first inside radius R1. A length L3 (see FIG. 6), in the wheel axial direction, of the recessed portion K is equal to or more than the basic length L1 (see FIG. 2).

Hereinbelow, for purposes of this description, machining in which the outer edge of the disc material, extending outwardly in the wheel radial direction, is bent downward (inwardly in the vehicle width direction) over the whole region in the wheel circumferential direction by bringing the inner mold D and the outer mold P close relative to each other in the wheel axial direction in the state where the disc material is put on the inner mold D is referred to as "drawing." Further, a case where a gap between the outside radius of the inner mold D and the inside radius of the outer mold P is less than the thickness of the outer edge of the disc material at this point (that is, machining with plastic deformation that forcibly decreases the thickness of the outer edge of the disc material) is referred to as "ironing."

A gap (hereinafter referred to as a "first gap") (R1−r1) in the wheel radial direction between the first outside radius r1 of the inner mold D and the first inside radius R1 of the outer mold P is set to be less than a thickness T of the outer edge of the disc material WA just before the start of the flange portion forming step, and a gap (hereinafter referred to as a "second gap") (R2−r1) in the wheel radial direction between the first outside radius r1 of the inner mold D and the second inside radius R2 of the outer mold P is also set to be less than the thickness T of the outer edge of the disc material WA (R1−r1<T, R2−r1<T).

Figure 7:
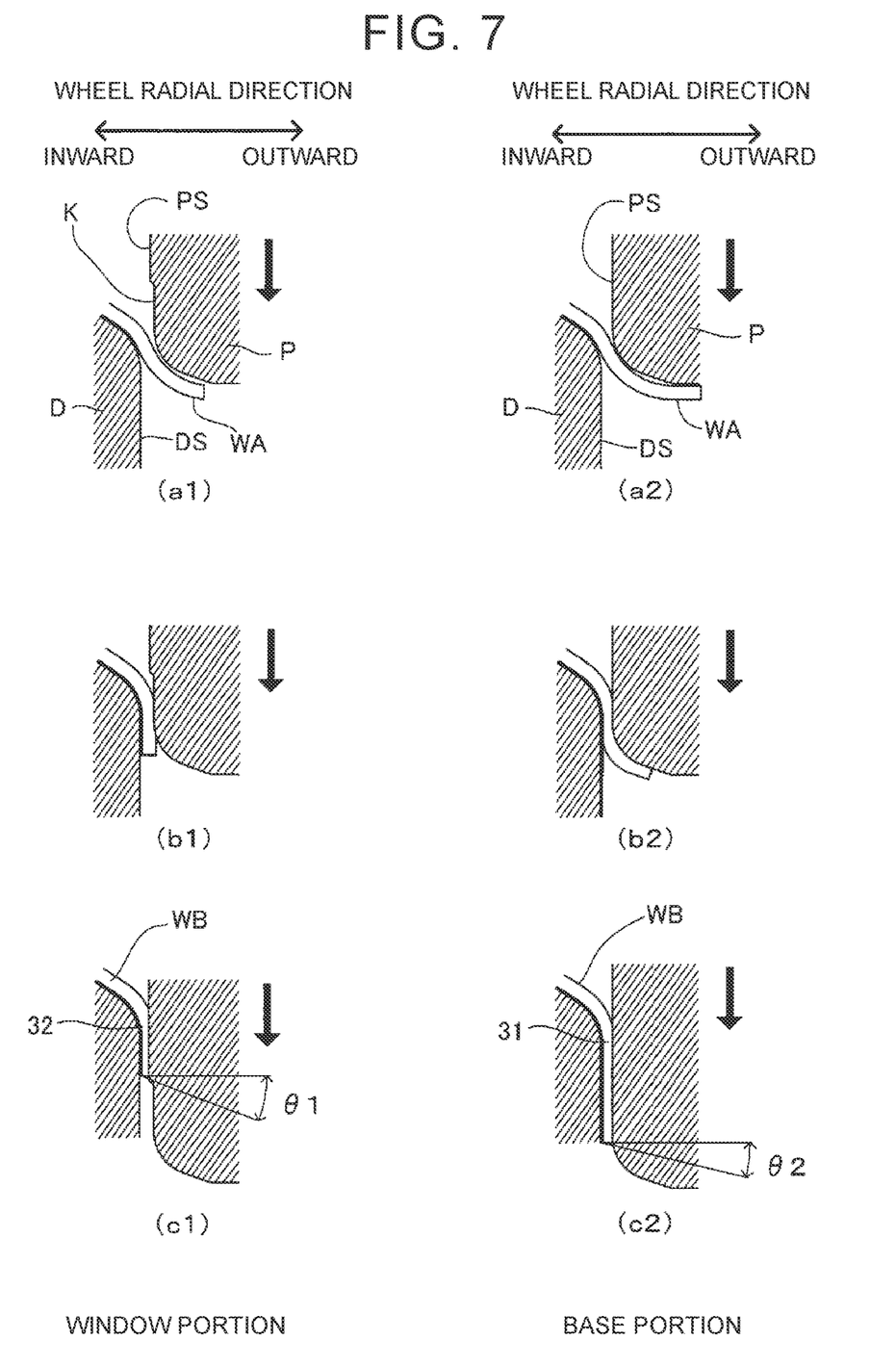
FIG. 7 is a view illustrating an example of the course of form changes of a window portion and a base portion in a flange portion in a first embodiment of the flange portion forming step.

As illustrated in (a2)→(b2)→(c2) in FIG. 7, in the base portion 31 of the flange portion 30, the cylindrical inner surface PS having the first inside radius R1 and the cylindrical outer surface DS having the first outside radius r1 contribute to machining throughout one stroke. Accordingly, in the base portion 31 of the flange portion, "drawing" and "ironing" are performed at the same time throughout one stroke.

As illustrated in (a1)→(b1)→(c1) in FIG. 7, in the window portion 32 of the flange portion 30, the cylindrical inner surface having the second inside radius R2 and the cylindrical outer surface DS having the first outside radius r1 contribute to machining in the first half of one stroke, and the cylindrical inner surface PS having the first inside radius R1 and the cylindrical outer surface DS having the first outside radius r1 contribute to machining in the second half of one stroke. Accordingly, in the window portion 32 of the flange portion 30, "drawing" and "ironing" are performed at the same time in the first half of one stroke, and in the second half of one stroke, only "ironing" is performed in the state where the outer edge of the disc material has adhered to the cylindrical outer surface DS of the inner mold D.

Here, in the case where "drawing" and "ironing" are performed at the same time (that is, in the case where "ironing" is performed while the outer edge of the disc material is being bent), "ironing" is performed in the state where the outer edge of the disc material has not adhered to the cylindrical outer surface DS of the inner mold D ((a2)→(b2)→(c2) in FIG. 7 and (a1)→(b1) in FIG. 7). Accordingly, due to a frictional force generated on the contact face between the outer edge of the disc material and the cylindrical inner surface of the outer mold P at the time when the outer mold P is moved downward relative to the inner mold D, a downward flow of the material of a radially outside part of the outer edge of the bent disc material is easily generated. Meanwhile, the material of a radially inside part of the outer edge of the disc material can relatively freely flow downward. As a result, a "phenomenon that the amount of downward flow of the material of the radially outside part, in the wheel radial direction, of the outer edge of the bent disc material becomes large due to the frictional force in comparison with the amount of downward flow of the material of the radially inside part of the outer edge" does not occur conspicuously. Hereinbelow, for purposes of this description, this phenomenon is referred to as an "unbalanced flow phenomenon."

As a result, particularly in the case where the end surface of the outer edge of the disc material WA just before the start of the flange portion forming step is parallel to the thickness direction of the disc material WA, there does not occur conspicuously such a situation that the axial length of the radially outside part of the outer edge of the bent disc material becomes longer than the axial length of the radially inside part thereof. In other words, there does not conspicuously occur such a situation that the end surface of the outer edge of the disc material bent along the wheel axial direction is inclined from the wheel radial direction such that the length, in the wheel axial direction, of the radially outside part becomes longer than the length, in the wheel axial direction, of the radially inside part. Hereinbelow, a tilt angle (see θ1, θ2 in FIG. 7) of the end surface from the wheel radial direction in terms of a direction where the end surface of the outer edge of the disc material bent along the wheel axial direction is inclined such that the length, in the wheel axial direction, of the radially outside part becomes longer than the length, in the wheel axial direction, of the radially inside part is just referred to as a "tilt angle." In the case where "drawing" and "ironing" are performed at the same time as described above, the "unbalanced flow phenomenon" does not occur conspicuously, so that the "tilt angle" is relatively small.

As described above, in the base portion 31 of the flange portion 30, "drawing" and "ironing" are performed at the same time throughout one stroke, so that the "unbalanced flow phenomenon" does not occur conspicuously. Accordingly, the "tilt angle" of the end surface of the base portion 31 is relatively small (see θ2 in FIG. 7).

In the meantime, in the case where only "ironing" is performed, "ironing" is started and performed in the state where the outer edge of the disc material has adhered to the cylindrical outer surface DS of the inner mold D ((b1)→(c1) in FIG. 7) as described above. Accordingly, in this case, a downward flow of the material of the radially outside part in the outer edge of the bent disc material easily occurs due to the frictional force, while a downward flow of the material of the radially inside part in the outer edge of the disc material can hardly occur. As a result, the "unbalanced flow phenomenon" easily occurs conspicuously. Accordingly, the "tilt angle" is relatively large.

Thus, in the window portion 32 of the flange portion 30, "drawing" and "ironing" are performed at the same time in the first half of one stroke similarly to the base portion 31, so the "tilt angle" of the end surface of the window portion 32 is relatively small at the end of the first half of one stroke. After that, only "ironing" is performed in the second half of one stroke, so the "tilt angle" of the end surface of the window portion 32 is eventually relatively large (see θ1 in FIG. 7). Here, θ1 corresponds to the "first tilt angle", and θ2 corresponds to the "second tilt angle."

(Operations/Effects)

Figure 8:
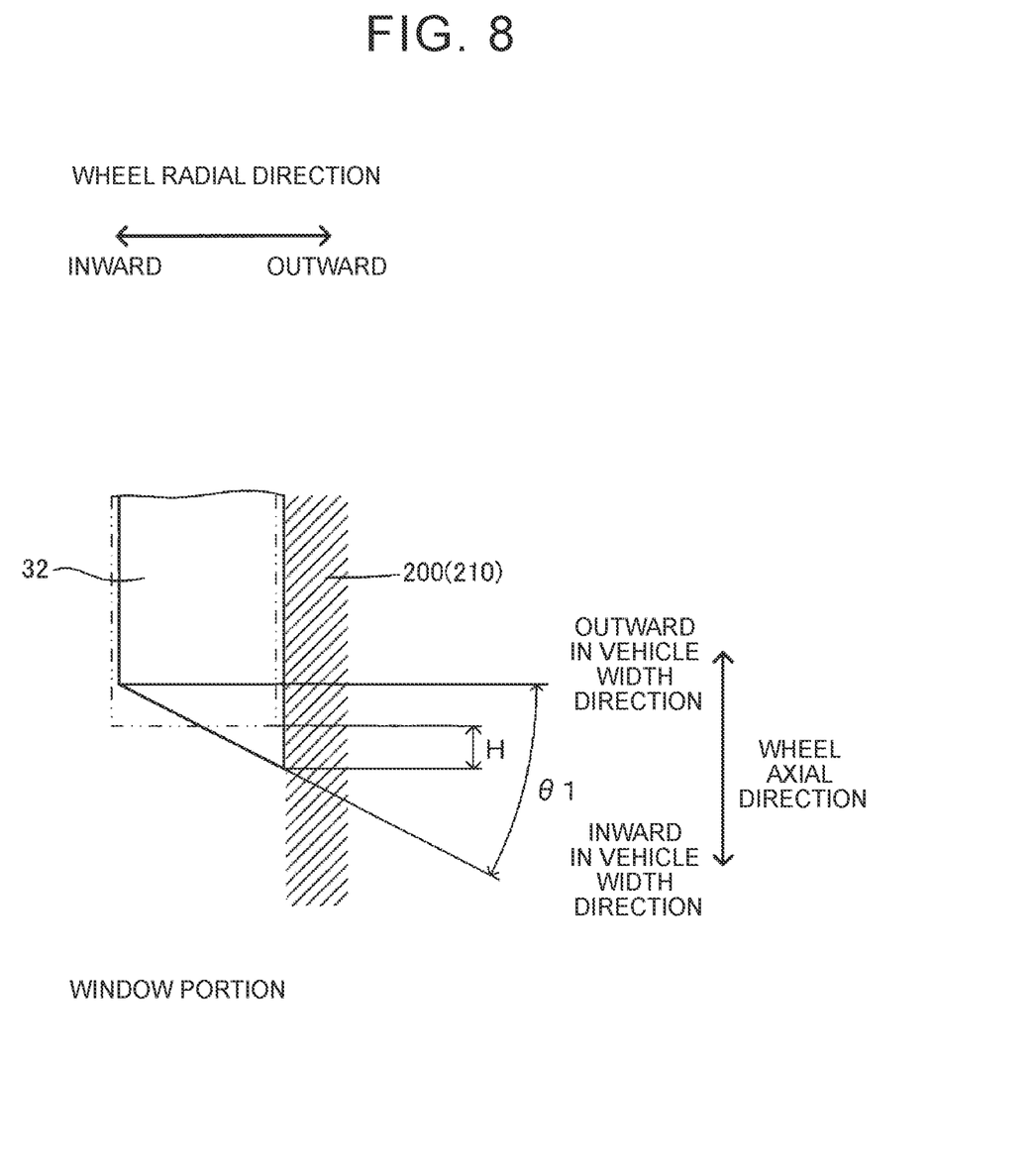
FIG. 8 is a view to describe a tilt angle of an inner end surface, in the vehicle width direction, of the window portion in the flange portion after the flange portion forming step is completed.

FIG. 8 illustrates a contact state between the window portion 32 and the wheel rim 200 (the well portion 210) in the state where the flange portion 30 (the window portion 32) of the wheel disc 100 is joined to the wheel rim 200 (the well portion 210). In FIG. 8, a case where the "tilt angle" of the end surface of the window portion 32 is zero is indicated by an alternate long and two short dashes line, and a case where the "tilt angle" is larger than zero while the total amount (total volume) of the material is the same as the case where the "tilt angle" is zero is indicated by a continuous line.

As is understood from FIG. 8, in terms of the window portion 32 of the flange portion 30, in the case where the "tilt angle" θ1 of the end surface of the window portion 32 is larger than zero, the minimum length (see L2 in FIG. 2), in the wheel axial direction, of the window portion 32 is larger only by a value H than that in the case where the "tilt angle" θ1 is zero. In addition, as the "tilt angle" θ1 is larger, the value H is larger, so the minimum length (see L2 in FIG. 2), in the wheel axial direction, of the window portion 32 (accordingly, the contact area between the window portion 32 and the wheel rim 200) is larger. Consequently, the rigidity as the whole wheel tends to improve.

Figure 9:
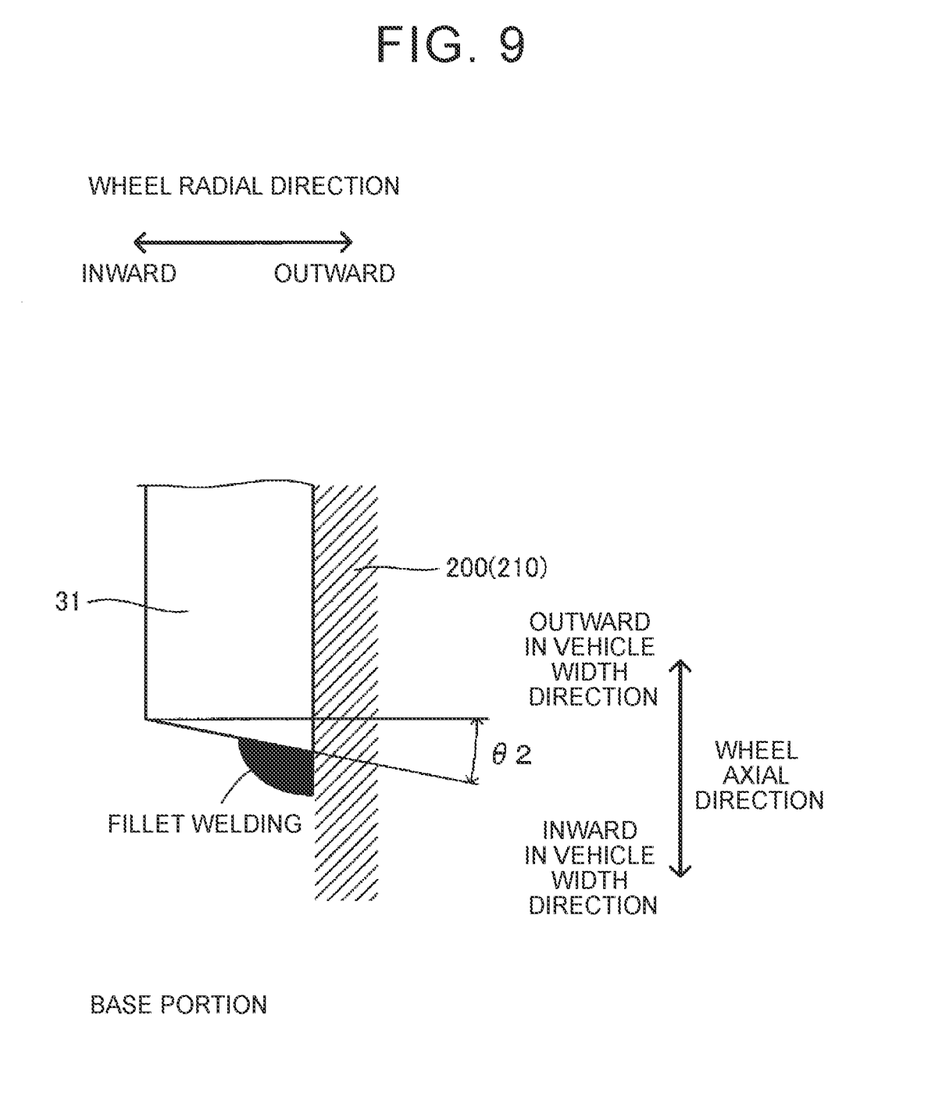
FIG. 9 is a view to describe a tilt angle of an inner end surface, in the vehicle width direction, of the base portion in the flange portion after the flange portion forming step is completed.

FIG. 9 illustrates a state where the end surface of the base portion 31 is welded by fillet welding to the inner peripheral surface of the wheel rim 200 (the well portion 210) in the state where the flange portion 30 (the base portion 31) of the wheel disc 100 is joined to the wheel rim 200 (the well portion 210).

In terms of the base portion 31 of the flange portion 30, as the "tilt angle" θ2 of the end surface of the base portion 31 is smaller (that is, the angle between the end surface of the base portion 31 and the inner peripheral surface of the wheel rim 200 becomes closer to a right angle), the weld strength at the time when the end surface of the base portion 31 is welded by fillet welding to the inner peripheral surface of the wheel rim 200 tends to be larger.

In terms of these points, in the embodiment, the "tilt angle" θ1 is easily increased in terms of the end surface of the window portion 32 of the flange portion 30, and the "tilt angle" θ2 is easily decreased in terms of the end surface of the base portion 31 of the flange portion 30. Accordingly, in the embodiment, the rigidity as the whole wheel can be improved, and the weld strength at the time when the end surface of the base portion 31 of the flange portion 30 is welded by fillet welding to the inner peripheral surface of the wheel rim 200 can be made large.

The invention is not limited to the above embodiment, and various applications and modifications can be made within a range that does not deviate from the object of the invention. The following embodiments in which the above embodiment is modified can be performed, for example.

That is, in the embodiment, the "first gap" (R1−r1) is set to be less than the thickness T of the outer edge of the disc material WA and the "second gap" (R2−r1) is also set to be less than the thickness T of the outer edge of the disc material WA (R1−r1<T, R2−r1<T). However, the "first gap" (R1−r1) can be set to be equal to or more than the thickness T of the outer edge of the disc material WA and the "second gap" (R2−r1) can be also set to be equal to or more than the thickness T of the outer edge of the disc material WA (R1−r1≥T, R2−r1≥T, a first modification).

Figure 10:
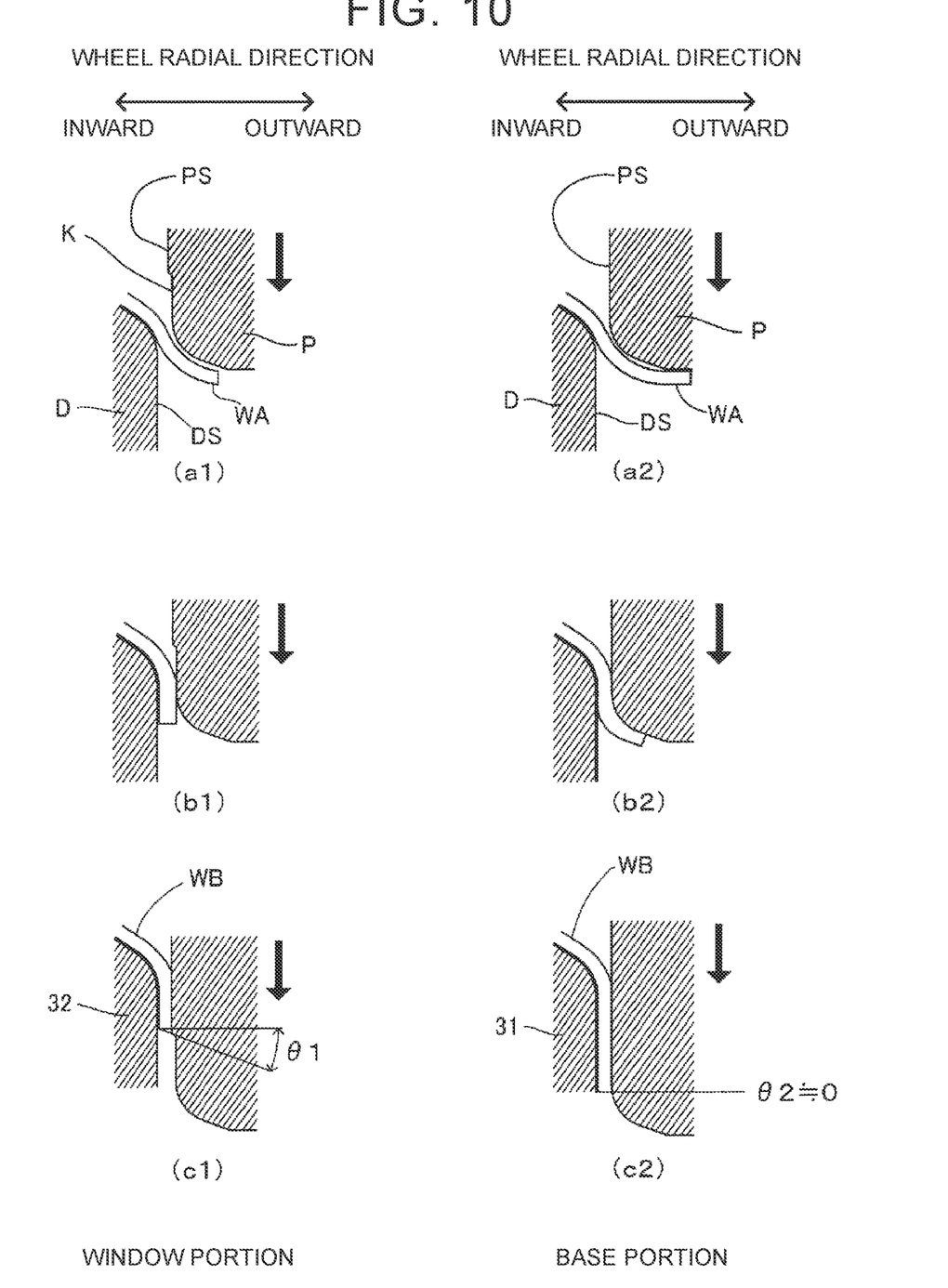
FIG. 10 is a view corresponding to FIG. 7 and illustrating another example of the course of form changes of a window portion and a base portion in a flange portion in a second embodiment of the flange portion forming step.

In the first modification, as illustrated in (a2)→(b2)→(c2) in FIG. 10, only "drawing" is performed throughout one stroke in the base portion 31 of the flange portion 30. Here, in the case where only "drawing" is performed (that is, in the case where the outer edge of the disc material is just bent without performing "ironing"), the "unbalanced flow phenomenon" does not occur (or hardly occurs). As a result, the "tilt angle" of the end surface of the base portion 31 is zero (or a very small value near zero) (see θ2 in FIG. 10).

In the meantime, as illustrated in (a1)→(b1)→(c1) in FIG. 10, only "drawing" is performed in the first half of one stroke in the window portion 32 of the flange portion 30. Note that, as illustrated in FIG. 11, when "drawing" is performed on the whole circumferential region of the outer edge of the disc material W (WA), flows of the material from the arcuate parts W1 at four corners in the outer edge of the disc material W (WA) to their adjacent linear parts W2 in the outer edge occur inevitably. That is, at the point when the first half of one stroke is finished, the thickness of a part, of the disc material, corresponding to the window portion 32 of the flange portion 30 can be increased to be larger than the "first gap." As a result, in the window portion 32 of the flange portion 30, only "ironing" is performed in the state where the outer edge of the disc material has adhered to the cylindrical outer surface DS of the inner mold D, in the second half of one stroke.

Thus, in the first modification, in the window portion 32 of the flange portion 30, only "drawing" is performed in the first half of one stroke similarly to the base portion 31, so that the "tilt angle" of the end surface of the window portion 32 is zero (or a very small value near zero) at the end of the first half of one stroke. After that, only "ironing" is performed in the second half of one stroke, so the "tilt angle" of the end surface of the window portion 32 is eventually relatively large (see θ1 in FIG. 10).

Thus, similarly to the above embodiment, in the first modification, the "tilt angle" θ1 is easily increased in terms of the end surface of the window portion 32 of the flange portion 30, and the "tilt angle" θ2 is easily decreased in terms of the end surface of the base portion 31 of the flange portion 30. Accordingly, the rigidity as the whole wheel can be improved, and the weld strength at the time when the end surface of the base portion 31 of the flange portion 30 is welded by fillet welding to the inner peripheral surface of the wheel rim 200 can be made large.

In addition, in the first modification, "ironing" is not performed in the base portion 31 of the flange portion 30. Accordingly, the "unbalanced flow phenomenon" does not occur (or hardly occurs), so that the "tilt angle" θ2 of the end surface of the base portion 31 is zero (or a very small value near zero). Accordingly, the weld strength at the time when the end surface of the base portion 31 of the flange portion 30 is welded by fillet welding to the inner peripheral surface of the wheel rim 200 can be made largest.

Further, the "first gap" (R1−r1) can be set to be less than the thickness T of the outer edge of the disc material WA and the "second gap" (R2−r1) can be set to be equal to or more than the thickness T of the outer edge of the disc material WA (R1−r1<T, R2−r1≥T, a second modification).

In the second modification, "drawing" and "ironing" are performed at the same time throughout one stroke in the base portion 31 of the flange portion 30. Accordingly, similarly to the above embodiment, the "unbalanced flow phenomenon" does not occur conspicuously, so the "tilt angle" of the end surface of the base portion 31 is relatively small.

In the meantime, only "drawing" is performed in the first half of one stroke in the window portion 32 of the flange portion 30. However, at the point when the first half of one stroke is finished, the thickness of a part, of the disc material, corresponding to the window portion 32 of the flange portion 30 can be larger than the "first gap" (R1−r1) due to the same mechanism as the case of the first modification. As a result, in the window portion 32 of the flange portion 30, only "ironing" is performed in the state where the outer edge of the disc material has adhered to the cylindrical outer surface DS of the inner mold D, in the second half of one stroke. Accordingly, the "tilt angle" of the end surface of the window portion 32 is relatively large, eventually.

Thus, similarly to the above embodiment, in the second modification, the "tilt angle" θ1 is easily increased in terms of the end surface of the window portion 32 of the flange portion 30, and the "tilt angle" θ2 is easily decreased in terms of the end surface of the base portion 31 of the flange portion 30. Accordingly, the rigidity as the whole wheel can be improved, and the weld strength at the time when the end surface of the base portion 31 of the flange portion 30 is welded by fillet welding to the inner peripheral surface of the wheel rim 200 can be made large.

Further, in the above embodiment, the inner mold D is fixed and the outer mold P is moved down so that the outer mold P is brought close relative to the inner mold D in the axial direction. However, the outer mold P may be fixed and the inner mold D may be moved up, or the inner mold D may be moved up while the outer mold P is moved down.

Further, in the above embodiment, the inner surface of the recessed portion K formed on the cylindrical inner surface PS of the outer mold P constitutes a part of the cylindrical inner surface having the second inside radius R2 larger than the first inside radius R1. However, the inner surface of the recessed portion K may have any shape as long as the inner surface of the recessed portion K is hollowed outwardly in the wheel radial direction from the cylindrical inner surface PS.

DESCRIPTION OF THE REFERENCE NUMERALS

100/wheel disc, 200/wheel rim, 10/hub attachment portion, 20/ridge, 30/flange portion, 31/base portion, 32/window portion, P/outer mold, D/inner mold, K/recessed portion

What is claimed is:

1. A manufacturing method for a wheel disc including an annular flange portion provided in an outer periphery so as to extend inwardly in a vehicle width direction generally in parallel with a wheel axial direction,
   the flange portion including a plurality of base portions provided in a plurality of ranges different from each other in a wheel circumferential direction and having a uniform basic length in the wheel axial direction, and
   a plurality of window portions each provided between the base portions adjacent to each other in the wheel circumferential direction and having a length, in the wheel axial direction,
   shorter than the basic length,
   the manufacturing method comprising:
   forming the flange portion such that an outer edge of a disc material in which the flange portion has not been formed is bent inwardly in the vehicle width direction over a whole circumferential region so as to be generally in parallel with the wheel axial direction,
   the disc material including a hub attachment portion with a hub hole and a hub attachment surface,
   the hub attachment portion having a disc shape that extends continuously around the hub hole and that is configured to extend around a wheel shaft, wherein:
   in the forming of the flange portion,
   the flange portion is formed such that,
   in a state where the disc material is coaxially put on an inner mold having a cylindrical outer surface with a first outside radius,
   the inner mold and an outer mold, which has a cylindrical inner surface with a first inside radius larger than the first outside radius and is placed above the inner mold coaxially with the inner mold, are brought close relative to each other in the wheel axial direction by one stroke so that the outer edge of the disc material is bent downward; and
   the cylindrical inner surface of the outer mold is provided with recessed portions hollowed outwardly in a wheel radial direction,
   the recessed portions being located at positions aligned with the window portions in the wheel circumferential direction and formed in a range from a middle position to a bottom end in the wheel axial direction.

2. The manufacturing method according to claim 1, wherein an inner surface of each of the recessed portions constitutes a part of a cylindrical inner surface having a second inside radius larger than the first inside radius.

3. The manufacturing method according to claim 2, wherein:
   a gap, in the wheel radial direction, between the first outside radius of the inner mold and the first inside radius of the outer mold is less than a thickness of the outer edge of the disc material; and
   a gap, in the wheel radial direction, between the first outside radius of the inner mold and the second inside radius of the outer mold is also less than the thickness of the outer edge of the disc material.

4. The manufacturing method according to claim 2, wherein:
   a gap, in the wheel radial direction, between the first outside radius of the inner mold and the first inside radius of the outer mold is equal to or more than a thickness of the outer edge of the disc material; and
   a gap, in the wheel radial direction, between the first outside radius of the inner mold and the second inside radius of the outer mold is also equal to or more than the thickness of the outer edge of the disc material.

5. The manufacturing method according to claim 2, wherein
   a gap, in the wheel radial direction, between the first outside radius of the inner mold and the first inside radius of the outer mold is less than a thickness of the outer edge of the disc material; and
   a gap, in the wheel radial direction, between the first outside radius of the inner mold and the second inside radius of the outer mold is equal to or more than the thickness of the outer edge of the disc material.

* * * * *